(12) United States Patent
Rowe

(10) Patent No.: US 9,643,254 B2
(45) Date of Patent: May 9, 2017

(54) ANIONIC REAGENT ELEMENT COMPLEXES, THEIR VARIATIONS, AND THEIR USES

(71) Applicant: Toyota Motor Engineering & Manufacturing North America, Inc., Erlanger, KY (US)

(72) Inventor: Michael P. Rowe, Pinckney, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/173,603

(22) Filed: Jun. 3, 2016

(65) Prior Publication Data

US 2016/0279713 A1 Sep. 29, 2016

Related U.S. Application Data

(63) Continuation-in-part of application No. 14/506,373, filed on Oct. 3, 2014, now Pat. No. 9,384,878, which
(Continued)

(51) Int. Cl.
*B22F 9/24* (2006.01)
*B22F 1/00* (2006.01)
(Continued)

(52) U.S. Cl.
CPC .............. *B22F 9/24* (2013.01); *B22F 1/0018* (2013.01); *B22F 1/0044* (2013.01); *C01B 6/21* (2013.01);
(Continued)

(58) Field of Classification Search
CPC .... C01B 6/21; C01B 6/06; C01B 6/02; C01B 6/006; Y10S 977/81; Y10S 977/896;
(Continued)

(56) References Cited

U.S. PATENT DOCUMENTS 7,041,350 B1 * 5/2006 Rule ...................... C08G 63/88
428/221
7,785,392 B2 8/2010 Shim et al.
(Continued)

FOREIGN PATENT DOCUMENTS

JP    2012038697 A    2/2012
JP    2013073839 A    4/2013
(Continued)

OTHER PUBLICATIONS

Chen et al., "Improved Dehydrogenation Properties of $Ca(BH_4)_2 \cdot nNH_3$ (n=1, 2, and 4) Combined with $Mg(BH_4)_2$", J. Phys. Chem., Sep. 2012, pp. 21162-21168, vol. 116.
(Continued)

*Primary Examiner* — Stanley Silverman
*Assistant Examiner* — Syed Iqbal
(74) *Attorney, Agent, or Firm* — Christopher G. Darrow; Darrow & Mustafa PC

(57) ABSTRACT

A novel class of reagents, useful for synthesis of elemental nanoparticles, includes at least one element, formally in oxidation state zero in complex with a hydride molecule. The reagents can optionally include an additional ligand incorporated into the complex. Elemental nanoparticles are synthesized by adding solvent to the reagent, optionally with a free ligand and/or a monoatomic cation.

14 Claims, 3 Drawing Sheets

Related U.S. Application Data is a continuation-in-part of application No. 14/269,909, filed on May 5, 2014, now Pat. No. 9,260,312, and a continuation-in-part of application No. 14/269,895, filed on May 5, 2014, now Pat. No. 9,260,305, and a continuation-in-part of application No. 14/046,081, filed on Oct. 4, 2013, now Pat. No. 8,980,219.

(60) Provisional application No. 62/319,659, filed on Apr. 7, 2016.

(51) Int. Cl.

| | | |
|---|---|---|
| *C01B 6/21* | (2006.01) | |
| *H01F 1/03* | (2006.01) | |
| *H01F 3/00* | (2006.01) | |
| *B82Y 40/00* | (2011.01) | |
| *B82Y 30/00* | (2011.01) | |

(52) U.S. Cl.
CPC ............. *H01F 1/0311* (2013.01); *H01F 3/00* (2013.01); *B22F 2009/245* (2013.01); *B22F 2301/40* (2013.01); *B22F 2998/10* (2013.01); *B82Y 30/00* (2013.01); *B82Y 40/00* (2013.01); *Y10S 977/773* (2013.01); *Y10S 977/81* (2013.01); *Y10S 977/896* (2013.01)

(58) Field of Classification Search
CPC ..... Y10S 977/773; B82Y 30/00; B82Y 40/00; B22F 2998/10; B22F 2009/245; B22F 2301/40; B22F 9/24; B22F 1/0044; B22F 1/0018; H01F 1/0311; H01F 3/00
See application file for complete search history.

(56) References Cited

U.S. PATENT DOCUMENTS

| 8,192,866 | B2 | 6/2012 | Golightly et al. |
| 8,372,177 | B1 | 2/2013 | Thoma et al. |
| 8,395,003 | B2 | 3/2013 | Leger et al. |
| 8,980,219 | B1 | 3/2015 | Rowe et al. |
| 9,142,834 | B2 | 9/2015 | Mohtadi et al. |
| 2005/0217427 | A1 | 10/2005 | Suthersan et al. |
| 2009/0029148 | A1 | 1/2009 | Hashimoto et al. |
| 2009/0090214 | A1 | 4/2009 | Cheng |
| 2009/0264277 | A1 | 10/2009 | Raj et al. |
| 2013/0084502 | A1 | 4/2013 | Singh et al. |
| 2015/0068646 | A1 | 3/2015 | Rowe |
| 2015/0096887 | A1 | 4/2015 | McDonald et al. |
| 2015/0097649 | A1 | 4/2015 | Rowe |
| 2015/0098882 | A1 | 4/2015 | Rowe |
| 2015/0098884 | A1 | 4/2015 | Rowe |
| 2015/0098885 | A1 | 4/2015 | Rowe |
| 2015/0098886 | A1 | 4/2015 | Rowe et al. |
| 2015/0098892 | A1 | 4/2015 | Rowe et al. |
| 2015/0099118 | A1 | 4/2015 | Mizuno et al. |
| 2015/0099135 | A1 | 4/2015 | Mohtadi et al. |
| 2015/0099172 | A1 | 4/2015 | Rowe et al. |
| 2015/0099182 | A1 | 4/2015 | Singh et al. |
| 2015/0099183 | A1 | 4/2015 | Singh et al. |
| 2016/0199916 | A1 | 7/2016 | Rowe et al. |
| 2016/0200753 | A1 | 7/2016 | Rowe et al. |

FOREIGN PATENT DOCUMENTS

| JP | 2013131366 A | 7/2013 | |
| WO | 2012007830 A1 | 1/2012 | |
| WO | WO 2012007830 A1 * | 1/2012 | ........... C01B 3/0042 |
| WO | 2013056185 A1 | 4/2013 | |
| WO | 2013063161 A2 | 5/2013 | |

OTHER PUBLICATIONS

Imamura et al., "Dehydriding of Sn1MgH2 nanocomposite formed by ball milling of MgH2 with Sn", Int. J. Hydrogen Energy, Jul. 2007, pp. 4191-4194, vol. 32.

Schüth et al., "Light Metal Hydrides and Complex Hydrides for Hydrogen Storage", Chem Commun, Sep. 2004, pp. 2249-2258, Issue 20.

Varin et al., "The effects of ball milling and nonmetric nickel additive on the hydrogen desorption from lithium borohydride and manganese chloride (3LiBH4+MnCl2) mixture", Int. J. Hydrogen Energy, Mar. 2010, pp. 3588-3597, vol. 35.

Wronski et al., "A new nanonickel catalyst for hydrogen storage in solid-state magnesium hydrides", Int. J. Hydrogen Energy, Sep. 2011, pp. 1159-1166, vol. 36.

* cited by examiner

US 9,643,254 B2

ANIONIC REAGENT ELEMENT COMPLEXES, THEIR VARIATIONS, AND THEIR USES

CROSS-REFERENCE TO RELATED APPLICATIONS

This application claims the benefit of U.S. Provisional Application No. 62/319,659, filed 7 Apr. 2016. This application is also a continuation-in-part of currently pending U.S. patent application Ser. No. 14/506,373, filed 3 Oct. 2014, which is a continuation-in-part of each of: U.S. patent application Ser. No. 14/269,909, filed 5 May 2014, now U.S. Pat. No. 9,260,312; and U.S. patent application Ser. No. 14/269,895, filed 5 May 2014, now U.S. Pat. No. 9,260,305, which is a continuation-in-part of U.S. patent application Ser. No. 14/046,081, filed 4 Oct. 2013, now U.S. Pat. No. 8,980,219. Each of the above-reference patent applications is herein incorporated by reference in its entirety.

TECHNICAL FIELD

The present disclosure relates to novel reagents useful for nanoparticle synthesis, methods of making said reagents, and processes for synthesizing nanoparticles from said reagents.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Hydrides, compounds in which metals or metalloids are bound directly to hydrogen, are relatively energetic molecules with a large variety of known and developing applications in chemistry and energy technology. Such applications include uses as reducing agents, hydrogenation catalysts, desiccants, potent bases, components in rechargeable batteries, and potentially as solid hydrogen storage vehicles in fuel cell technology.

Elemental nanoparticles, particles of composed of elements in elemental form (e.g. not ionized, covalently bonded to other elements, etc) with a dimension less than 100 nm, have unique physical, chemical, electrical, magnetic, optical, and other properties in comparison to their corresponding bulk elements. As such they are in use or under development in fields such as chemistry, medicine, energy, and advanced electronics, among others.

Synthetic methods for elemental nanoparticles are typically characterized as being "top-down" or "bottom-up" and comprise a variety of chemical, physical, and even biological approaches. Top-down techniques involve the physical breakdown of macroscale metallic particles, using a variety of energy inputs, into nanoscale particles. Bottom-up methods involve the formation of nanoparticles from isolated atoms, molecules, or clusters.

Physical force methods for top-down elemental nanoparticle synthesis have included milling of macroscale metal particles, laser ablation of macroscale metals, and spark erosion of macroscale metals. Chemical approaches to bottom-up synthesis commonly involve the reduction of metal salt to elemental metal with nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys, for example. Other physical methods can be expensive or otherwise unamenable to industrial scale. On the other hand, chemical reduction techniques can fail, for example in situations where precursor cations are resistant to chemical reduction. Mn(II) for example is virtually impervious to in situ chemical reduction, making this approach essentially non-viable for the synthesis of manganese nanoparticles.

A family of synthetic methodologies, capable of producing high-purity elemental nanoparticles having a single element or more than one element, would be useful.

SUMMARY

The present teachings provide novel reagents, methods for making the reagents, and processes for synthesizing nanoparticles using the reagents.

In one aspect, the present teachings provide reagents. The reagents include a complex having a formula, $Q^0.X_y.L_z$. $Q^0$ is an element, formally in oxidation state zero; X is a hydride molecule; L is an incorporated ligand; y is an integral or fractional value greater than zero; and z is zero or greater.

In another aspect, the present teachings provide reagents. The reagents include a complex having a formula, $Q^0.X_y.L_z$. $Q^0$ is a metalloid or non-metal element, formally in oxidation state zero; X is a hydride molecule; L is an incorporated ligand; y is an integral or fractional value greater than zero; and z is zero or greater.

In another aspect, the present teachings provide a process for synthesizing elemental nanoparticles. The process includes a step of adding solvent to a reagent complex of the type described above.

In another aspect, the present teachings provide a process for synthesizing elemental nanoparticles. The process includes a step of adding monoatomic cation to a reagent complex of the type described above.

BRIEF DESCRIPTION OF THE DRAWINGS

Various aspects and advantages of the disclosure will become apparent and more readily appreciated from the following description of the embodiments taken in conjunction with the accompanying drawings, of which.

DETAILED DESCRIPTION

Figure 1:
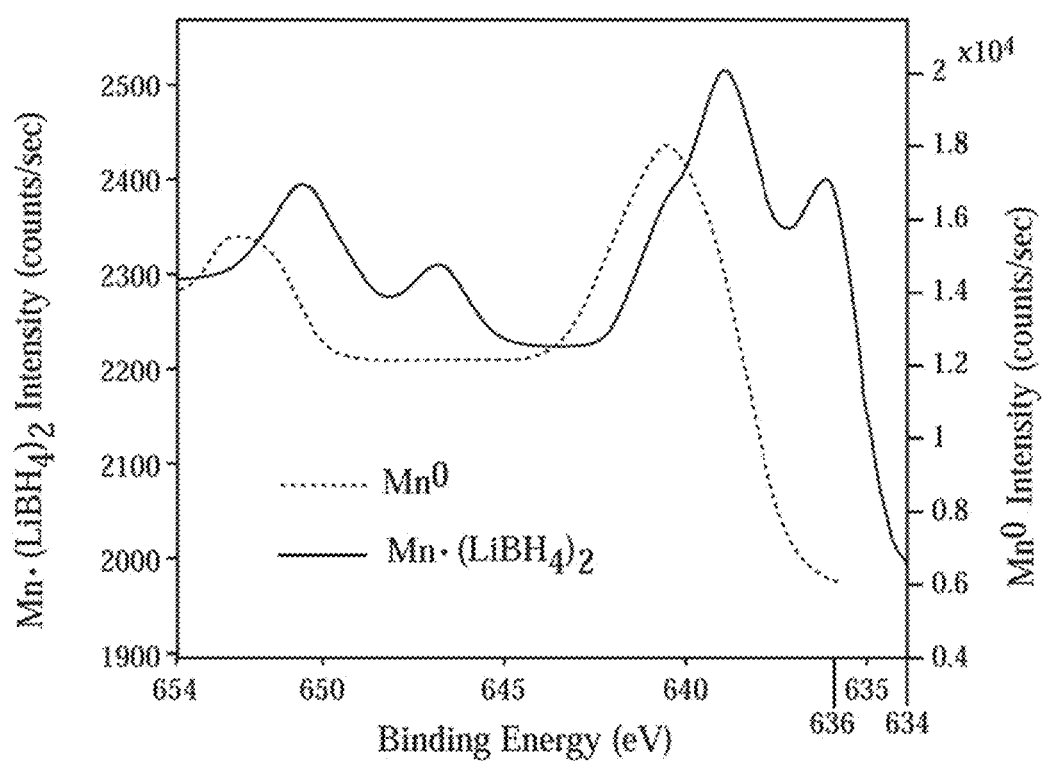
FIG. 1 is an overlay of x-ray photoelectron spectra (XPS) of bulk manganese powder and of a reagent complex having the formula $Mn.(LiBH_4)_2$.

The present disclosure provides a broad class of reagent complexes described as Anionic Element Reagent Complexes (AERCs) or, optionally, Ligated Anionic Reagent Complexes (LAERCs). The reagent complexes are shown to have broad utility in the synthesis of nanoparticles composed of one or more elements, formally in oxidation state zero, said synthesis being achievable through a variety of means. Nanoparticle synthesis according to the present disclosure is robust, reproducible, and easily applicable to a wide variety of elements.

The disclosed reagents include a complex having an element, formally in oxidation state zero, and a hydride molecule. The disclosed reagents can optionally include an additional ligand in the complex. Nanoparticle synthesis can be performed by process that include addition of a simple cation to the reagent; addition of a ligand to the reagent; or in the case where a ligand is present in the reagent complex, addition of a solvent to the reagent.

Thus, a reagent is disclosed, having a complex according to Formula I:

$$Q^0 \cdot X_y \cdot L_z \qquad\qquad \text{I,}$$

wherein $Q^0$ is an element, formally in oxidation state zero; X is a hydride molecule, L is an incorporated ligand, y is an integral or fractional value greater than zero, and z is an integral or fractional value of zero or greater than zero. The complex according to formula I will alternatively be referred to as an AERC if z is equal to zero or a LAERC if z is greater than zero.

The term "element", as used herein, refers generally to elements of Groups 2-16, in particular those that are solid under standard conditions of temperature and pressure such as 25° C. and 1 atmosphere pressure. The description that the element is formally in oxidation state zero indicates, at least, that it is in elemental form, having no formal positive or negative charge. An element that is formally in oxidation state zero may alternatively be referred to as a "zero-valent element". Atoms of the element, formally in oxidation state zero, will alternatively be referred to herein as "elemental atoms". It is to be appreciated that in some instances, $Q^0$, can include a plurality of elements, but that each element of the plurality will be in elemental form, or formally in oxidation state zero.

The term "hydride molecule" refers generally to any molecular species capable of functioning as a hydrogen anion donor. In different instances, a hydride molecule as referenced herein can be a binary metal hydride or "salt hydride" (e.g. NaH, or MgH$_2$), a binary metalloid hydride (e.g. BH$_3$), a complex metal hydride (e.g. LiAlH$_4$), or a complex metalloid hydride (e.g. LiBH$_4$ or Li(CH$_3$CH$_2$)$_3$BH). In some examples the hydride molecule will be LiBH$_4$. The term hydride molecule as described above can in some variations include a corresponding deuteride or tritide.

The term "ligand" refers to a molecule that can optionally be incorporated into a reagent complex (an "incorporated ligand"), or optionally added, in free form, to a reagent complex (a "free ligand"). In some instances, a ligand can be a surfactant, such as any molecule having significant surface active properties. Non-limiting examples of suitable surfactants can include nonionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, nitriles, alkyl amines, quaternary ammonium salts, carboxybetaines, sulfobetaines, or polymeric surfactants. In some particular implementations, a ligand can be at least one of a nitrile, an amine, and a carboxylate.

In different variations, the element, $Q^0$, can be a non-metal, a metalloid, or a metal. In some versions of the latter, the zero-valent element can be a metal. Thus, the reagent complex resulting from the ball-milling step can more particularly comprise a complex according to any of Formulae II-IV:

$$D^0 \cdot X_y \cdot L_z \qquad\qquad \text{II,}$$

$$E^0 \cdot X_y \cdot L_z \qquad\qquad \text{III,}$$

$$M^0 \cdot X_y \cdot L_z \qquad\qquad \text{IV,}$$

wherein $D^0$ is a non-metal, formally in oxidation state zero; wherein $E^0$ is a metalloid, formally in oxidation state zero; wherein $M^0$ is a metal, formally in oxidation state zero; and wherein X, y, and z are as defined above. In this usage, a non-metal refers to any of carbon, phosphorous, sulfur, and selenium; a metalloid refers to any of boron, silicon, germanium, arsenic, antimony, tellurium, and polonium; and a metal refers to any element of Groups 2-15 exclusive of metalloids and non-metals. In some instances, a metal can include a lanthanide.

The complexes of the present disclosure can have any supramolecular structure, or no supramolecular structure. Without being bound to any particular structure, and without limitation, the complex could exist as a supramolecular cluster of many elemental atoms interspersed with hydride molecules and or incorporated ligand. The complex could exist as a cluster of elemental atoms in which the cluster is surface-coated with hydride molecules and/or incorporated ligand. The complex could exist as individual elemental atoms having little to no molecular association with one another, but each being associated with hydride molecules and incorporated ligand molecules according to Formula I. Any of these microscopic structures, or any other consistent with Formula I, is intended to be within the scope of the present disclosure.

A method for synthesizing the above described reagent complex includes a step of ball-milling a mixture that includes: (i) a powder of an element, the element being formally in oxidation state zero, and (ii) a bulk preparation of a hydride molecule. The mixture can optionally include a bulk preparation of a ligand. The ball-milling step results in formation of the reagent complex of Formula I, thus it will be appreciated that the subscripts y and z correlate to the molar ratios hydride molecule and ligand (if present) relative to atoms of the element, respectively.

As used in relation to the disclosed method, the powder of an element can alternatively be referred to as an "elemental powder". While much of the following discussion focuses on methods using a single elemental powder, powders of one, two, or more elements can be employed simultaneously. The terms "hydride molecule" and "ligand" are as defined above, and bulk preparations thereof, or any other bulk forms that are readily reducible to powder, for example by ball-milling. An example of such another bulk form can be a compacted granular form. The bulk preparation of a hydride molecule and the bulk preparation of a ligand can be referred to alternatively as "bulk hydride molecule" and "bulk ligand" respectively. It will be appreciated that the elemental powder, bulk hydride molecule, and/or bulk ligand may not necessarily be 100% pure, but should generally consist predominantly of the element, the hydride molecule, and the ligand, respectively.

In some instances, the ball-milling step can be performed in an oxygen-free environment, in an anhydrous environment, or in an environment that is oxygen-free and anhydrous, such as under argon or under vacuum. An oxygen-free and/or anhydrous environment can potentially limit undesired oxidation of the resulting ligated reagent complex.

The ball-milling step of the present method will generally produce a complex according to Formula I, as described above, and the element, $Q^0$, as present in the complex will generally correspond to the element as present in the elemental powder. The mixture that is ball-milled in the ball-milling step can include any non-zero molar ratio of hydride molecules contained in the bulk hydride molecule to elemental atoms contained in the elemental powder. It will be understood that the value y in Formula I for the complex produced by the ball-milling step will generally reflect this molar ratio. For example, if the mixture to be ball-milled includes two equivalents of hydride molecule and one equivalent of elemental atoms, then the value y, according to Formula I, for the resulting complex will be two.

Similarly, the mixture that is ball-milled in the ball-milling step can include any molar ratio of ligand molecules contained in the bulk ligand to elemental atoms contained in the elemental powder. It will be understood that the value of z in Formula I for the complex produced by the ball-milling step will generally reflect this molar ratio. For example, if the mixture to be ball-milled includes two equivalents of ligand molecule and one equivalent of elemental atoms, then the value z, according to Formula I, for the resulting complex will be two. It is emphasized that inclusion of bulk ligand is optional, and that the value of z can be zero. Without being bound by any particular theory, it is believed that inclusion of bulk ligand can, among other effects, function to ablate or otherwise assist in decreasing the particle size of the elemental powder and/or of the formative complex during ball-milling.

An exemplary x-ray photoelectron spectra (XPS) of an AERC is shown in FIG. 1. In FIG. 1, an XPS of an AERC produced by ball-milling a mixture having manganese powder and a two-fold molar excess of lithium borohydride, and thus having the formula $Mn.(LiBH_4)_2$, is overlayed with an XPS of manganese powder. As seen in FIG. 1, the spectrum of manganese powder includes two broad peaks, each consisting of three component peaks observable after deconvolution. The three component peaks for the manganese powder can be assigned, based on published references, to manganese-oxide species (640.52 eV and 641.90 eV) and to zero-valent manganese (639.05 eV). The ball-milled reagent complex (AERC) represented in FIG. 1 has lost the oxide peak at 641.90 eV but retains the 640.52 eV peak, after negligible shifting. The ball-milled reagent complex also retains the zero-valent manganese peak at 639.05 eV, again after negligible shifting.

Of significance, the XPS of the AERC displays a new phase with component peaks at 637.75 eV and 636.06 eV. These can be assigned to manganese in complex with the hydride molecule. The comparison illustrates the loss of at least one manganese-oxide peak and the appearance of the new phases, resulting in a general shift toward lower electronic binding energies. Without being bound to any particular theory, it is believed that the hydride molecule may function to donate electron density to the zero-valent element, resulting in the appearance of the new peaks, and potentially stabilizing the complex.

Figure 2:
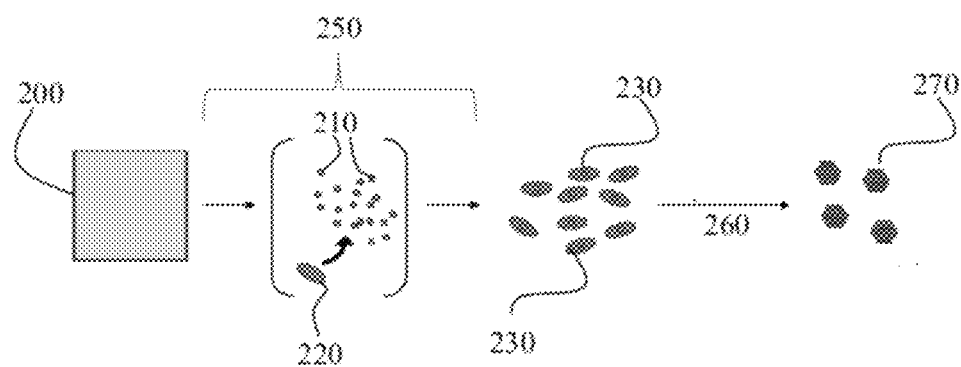
FIG. 2 is a schematic illustration of a method for making a reagent complex of the type shown in FIG. 1.

As shown in FIG. 2, reagents of the present disclosure can be used for synthesis of nanoparticles composed of one or more elements, each of the one or more elements substantially free of oxides. FIG. 2 shows a bulk element source material 200, such as a powder of the zero-valent element. During a mechanochemical step 250, which can include ball-milling in the presence of a hydride molecule 220, the bulk hydride 200 can be broken into smaller particles 210 which can combine with hydride molecule 220, eventually resulting in formation of the stable AERC 230. It will be noted that if a nitrile ligand is also added during the mechanochemical step, a LAERC will be formed. In a subsequent nanoparticle synthesis step 260, described in greater detail below, nanoparticles 270 of the zero-valent element are formed.

In instances where a ligand is included in the mechanochemical step 250, thus producing a LAERC, the ligand may improve the reactivity of the LAERC, relative to an otherwise equivalent AERC, in the subsequent nanoparticle synthesis step 260.

Figure 3A:
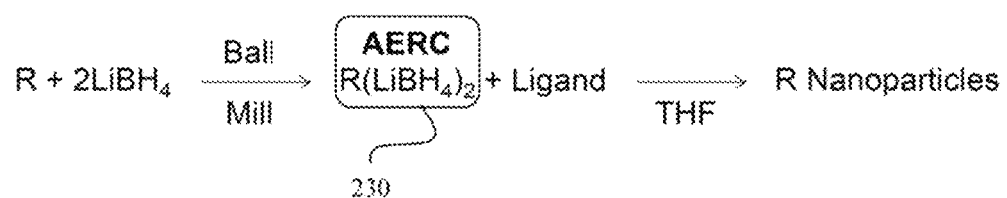
FIG. 3A is a schematic illustration of a process for synthesizing elemental nanoparticles using a reagent complex of the type shown in FIG. 1.

In one implementation, nanoparticle synthesis step 260 includes a process for synthesizing elemental nanoparticles, the process including a step of: combining a complex according to Formula I with a free ligand and a solvent. This process is illustrated schematically in FIG. 3A. The free ligand can be any type described above in the general definition of "ligand". Suitable solvents can include any molecular species, or combination of molecular species, capable of interacting with the constituents of an AERC or LAERC by means of non-bonding or transient-bonding interactions. In different implementations, the solvent used can be a hydrocarbon or aromatic species, including but not limited to: a straight-chain, branched, or cyclic alkyl or alkoxy; or a monocyclic or multicyclic aryl or heteroaryl. In some implementations, the solvent will be a non-coordinating or sterically hindered ether. The term solvent as described can in some variations include a deuterated or triterated form. In some implementation, a solvent can be an ether, such as THF.

Without being bound by any particular mechanism, it is believed that during combination of the solvent and ligand with the AERC 230, the dissolved ligand may oxidize, protonate, or otherwise covalently, datively, or ionically modify the hydride molecule incorporated in the complex, causing the complex to dissociate and allowing nanoparticles to aggregate. In variations where incorporated ligand is present in the complex (i.e. where ligand is included in the mechanicochemical step to produce a LAERC), free ligand is not needed. Instead, addition of solvent may cause incorporated ligand to dissociate from the complex, converting the LAERC to AERC and free ligand, where the reaction then proceeds as described above. It is believed that, in some instances, the nanoparticle synthesis step 260 may proceed more rapidly when solvent is added to a LAERC having incorporated ligand, in comparison to addition of solvent and free ligand to an otherwise identical AERC lacking incorporated.

In an alternative implementation, nanoparticle synthesis step 260 includes a different process for synthesizing elemental nanoparticles, the process including a step of: combining a complex according to Formula I with a cationic element. This process is illustrated schematically in FIG. 3B. The cationic element can alternatively be referred to as a monoatomic cation. The alternative synthetic procedure can be useful for preparing multi-element nanoparticles, i.e. nanoparticles having two or more elements. As in the example of FIG. 3A, an AERC 230 is first formed by ball-milling a mixture that includes bulk source material and hydride molecule. The AERC is then combined with a solvent and a monoatomic cation, the latter represented as R' in the example of FIG. 3B. Solvent and monoatomic cation can be combined with the AERC simultaneously or sequentially, and the combining step can optionally include an additional free ligand as described above. Similarly, a LAERC (having incorporated ligand) can be used in place of an AERC, as described above. The combining step results in production of nanoparticles having, per nanoparticle, both the formerly bulk element (R) and the formerly cationic element of the monoatomic cation (R' cation). It is believed that hydride molecule reduces the monoatomic cation to elemental (zero-valent) form, and dissociates from the AERC, enabling the formerly bulk element (R) and the second zero-valent element (R') to combine into nanoparticles having composition RR'. It will be appreciated that the combining step can include multiple monoatomic cations, in which case the resulting nanoparticles will include the formerly bulk element and each of the elements from the multiple monoatomic cations. For example if monoatomic cations R' cation and R" cation are combined, along with solvent, with an AERC having zero-valent element R, the resulting nanoparticles will be composed of RR'R". It will further be appreciated that the molar ratios of the multiple zero-valent elements in multi-element nanoparticles synthesized by this method will generally correspond to the molar ratios bulk element and one or more monoatomic cations employed in the combining step.

Figure 3B:
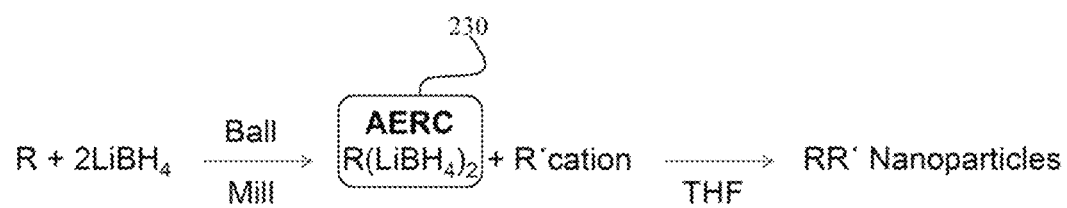
FIG. 3B is a schematic illustration of a process for synthesizing multi-element nanoparticles using a reagent complex of the type shown in FIG. 1.

In a particular example of the multi-element nanoparticle synthesis method of FIG. 3B, AERC having the formula Mn.(LiBH$_4$)$_2$ is prepared by ball-milling manganese powder with two molar equivalents of lithium borohydride. Addition of bismuth neodecanoate and heptylcyanide results in nanoparticles containing MnBi alloy, at a molar ratio determined by the molar ratio of cationic bismuth to elemental manganese in the reaction mixture The present disclosure is further illustrated with respect to the following examples. It needs to be understood that these examples are provided to illustrate specific embodiments of the present disclosure and should not be construed as limiting the scope of the present disclosure.

Example 1

AERC Preparation

One part manganese metal powder is mixed with 2 parts LiBH$_4$, with a total metal powder and LiBH$_4$ powder mass equal to or less than 10 grams, and ball-milled in a planetary ball-mill for 4 hours at 400 rpm (using a Fritsch pulervisette 7 planetary ball mill) in a 250 mL stainless steel airtight ball-mill jar with one ¾ inch, three ½ inch, and five ¼ inch 316 stainless steel ball bearings. The resulting product is an AERC having the formula Mn.(LiBH$_4$)$_2$. A manganese-region x-ray photoelectron spectrum of the AERC, shown in FIG. 1, contains two peaks, centered at about 637.75 and 636.06 eV, which are not present in the bulk manganese powder.

Example 2

Multi-Element Nanoparticle Synthesis 0.336 g of the AERC product of Example 1 is suspended in 200 mL of THF. Separate from the suspension, 2.215 g of bismuth neodecanoate and 3.07 g of heptylcyanide are dissolved in 200 mL of THF. The bismuth neodecanoate/heptylcyanide solution is added dropwise with stirring to the suspension to form manganese-bismuth nanoparticles of ~5 nm average diameter by x-ray diffraction.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A reagent complex having a formula:

wherein $Q^0$ is an element, formally in oxidation state zero; X is a hydride molecule, L is an incorporated ligand, y is an integral or fractional value greater than zero, and z is zero or greater.

2. A reagent complex having a formula,

wherein $Q^0$ is a metal, metalloid or non-metal element, formally in oxidation state zero; X is a hydride molecule, L is an incorporated ligand, y is an integral or fractional value greater than zero, and z is zero or greater.

3. The reagent complex as recited in claim 2, wherein the hydride molecule comprises a complex metal hydride or a complex metalloid hydride.

4. The reagent complex as recited in claim 2, wherein the hydride molecule comprises lithium borohydride.

5. The reagent complex as recited in claim 2, wherein y is about 4 or less.

6. A process for synthesizing elemental nanoparticles, the process comprising:
adding solvent to a reagent complex having a formula:

$$Q^0 \cdot X_y \cdot L_z,$$

wherein $Q^0$ is an element, formally in oxidation state zero, X is a hydride molecule, L is an incorporated ligand, y is an integral or fractional value greater than zero, and z is zero or greater.

7. The process as recited in claim 6, comprising adding a free ligand to the reagent complex.

8. The process as recited in claim 6, wherein the hydride molecule is lithium borohydride.

9. A process for synthesizing elemental nanoparticles, the process comprising:
adding a monoatomic cation to a reagent complex having a formula:

$$Q^0 \cdot X_y \cdot L_z,$$

wherein $Q^0$ is an element, formally in oxidation state zero; X is a hydride molecule; L is an incorporated ligand; y is an integral or fractional value greater than zero; and z is zero or greater.

10. The process as recited in claim 9, comprising adding a free ligand to the reagent complex.

11. The process as recited in claim 9, wherein the hydride molecule is lithium borohydride.

12. The process as recited in claim 9, wherein the element is a metalloid.

13. The process as recited in claim 9, wherein the element is a non-metal.

14. The process as recited in claim 9, wherein the element is a metal.

* * * * *

UNITED STATES PATENT AND TRADEMARK OFFICE
CERTIFICATE OF CORRECTION

PATENT NO. : 9,643,254 B2
APPLICATION NO. : 15/173603
DATED : May 9, 2017
INVENTOR(S) : Michael P. Rowe Page 1 of 3

It is certified that error appears in the above-identified patent and that said Letters Patent is hereby corrected as shown below:

In the Specification

Column 2, Line 21, "$Q^0.X_y$" should be -- $Q^0 \cdot X_y$ --

Column 2, Line 52, "$Mn.LiBH_4$" should be -- $Mn \cdot LiBH_4$ --

Column 2, Line 55, "$Mn.(LiBH_4)_2$" should be -- $Mn \cdot (LiBH_4)_2$ --

Column 2, Line 60, "$Mn.(LiBH_4)_2$" should be -- $Mn \cdot (LiBH_4)_2$ --

Column 2, Line 64, "$Mn.(LiBH_4)_2$" should be -- $Mn \cdot (LiBH_4)_2$ --

Column 2, Line 65, "$Mn.(LiBH_4)_2$" should be -- $Mn \cdot (LiBH_4)_2$ --

Column 3, Lines 1-2, "$Mn.(LiBH_4)_2$" should be -- $Mn \cdot (LiBH_4)_2$ --

Column 3, Line 4, "$Mn.(LiBH_4)_2$" should be -- $Mn \cdot (LiBH_4)_2$ --

Column 3, Lines 5-6, "$Mn.(LiBH_4)_2$" should be -- $Mn \cdot (LiBH_4)_2$ --

Column 3, Lines 10-11, "$Sn.(LiBH_4)_2$" should be -- $Sn \cdot (LiBH_4)_2$ --

Column 3, Line 16, "$Sn.(LiBH_4)_2$" should be -- $Sn \cdot (LiBH_4)_2$ --

Column 3, Line 19, "$W.(LiBH_4)_2$" should be -- $W \cdot (LiBH_4)_2$ --

Column 3, Line 23, "$W.(LiBH_4)_2$" should be -- $W \cdot (LiBH_4)_2$ --

Column 3, Lines 25-26, "$La.(LiBH_4)_2$" should be -- $La \cdot (LiBH_4)_2$ --

Signed and Sealed this
Ninth Day of April, 2019

Andrei Iancu
*Director of the United States Patent and Trademark Office*

CERTIFICATE OF CORRECTION (continued)
U.S. Pat. No. 9,643,254 B2

Column 3, Line 30, "La.(LiBH$_4$)$_2$" should be -- La•(LiBH$_4$)$_2$ --

Column 3, Lines 32-33, "Ge.(LiBH$_4$)$_2$" should be -- Ge•(LiBH$_4$)$_2$ --

Column 3, Line 37, "Ge.(LiBH$_4$)$_2$" should be -- Ge•(LiBH$_4$)$_2$ --

Column 3, Lines 38-39, "Se.(LiBH$_4$)$_2$" should be -- Se•(LiBH$_4$)$_2$ --

Column 3, Line 42, "C.(LiBH$_4$)$_2$" should be -- C•(LiBH$_4$)$_2$ --

Column 4, Line 35, "Q$^0$.X$_y$" should be -- Q$^0$•X$_y$ --

Column 4, Line 44, "D$^0$.X$_y$" should be -- D$^0$•X$_y$ --

Column 4, Line 50, "E$^0$.X$_y$" should be -- E$^0$•X$_y$ --

Column 4, Line 60, "M$^0$.X$_y$" should be -- M$^0$•X$_y$ --

Column 5, Line 29, "Q$^0$.X$_y$" should be -- Q$^0$•X$_y$ --

Column 5, Line 40, "D$^0$.X$_y$" should be -- D$^0$•X$_y$ --

Column 5, Line 42, "E$^0$.X$_y$" should be -- E$^0$•X$_y$ --

Column 5, Line 44, "M$^0$.X$_y$" should be -- M$^0$•X$_y$ --

Column 6, Line 33, "Mn.LiBH$_4$" should be -- Mn•LiBH$_4$ --

Column 6, Line 34, "Mn.(LiBH$_4$)$_2$" should be -- Mn•(LiBH$_4$)$_2$ --

Column 6, Line 53, "Mn.(LiBH$_4$)$_2$" should be -- Mn•(LiBH$_4$)$_2$ --

Column 7, Line 8, "Mn.(LiBH$_4$)$_2$" should be -- Mn•(LiBH$_4$)$_2$ --

Column 7, Line 13, "Mn.LiBH$_4$" should be -- Mn•LiBH$_4$ --

Column 7, Line 14, "Mn.(LiBH$_4$)$_2$" should be -- Mn•(LiBH$_4$)$_2$ --

Column 7, Line 21, "Mn.LiBH$_4$ and Mn.(LiBH$_4$)$_2$" should be -- Mn•LiBH$_4$ and Mn•(LiBH$_4$)$_2$ --

Column 7, Line 28, "Sn.(LiBH$_4$)$_2$" should be -- Sn•(LiBH$_4$)$_2$ --

Column 7, Line 32, "Sn.(LiBH$_4$)$_2$" should be -- Sn•(LiBH$_4$)$_2$ --

Column 7, Line 36, "Sn.(LiBH$_4$)$_2$" should be -- Sn•(LiBH$_4$)$_2$ --

CERTIFICATE OF CORRECTION (continued)
U.S. Pat. No. 9,643,254 B2

Column 7, Line 45, "W.(LiBH$_4$)$_2$" should be -- W•(LiBH$_4$)$_2$ --

Column 7, Line 50-51, "La.(LiBH$_4$)$_2$" should be -- La•(LiBH$_4$)$_2$ --

Column 7, Line 53, "Ge.(LiBH$_4$)$_2$" should be -- Ge•(LiBH$_4$)$_2$ --

Column 7, Line 63, "Se.(LiBH$_4$)$_2$" should be -- Se•(LiBH$_4$)$_2$ --

Column 7, Line 65, "C.(LiBH$_4$)$_2$" should be -- C•(LiBH$_4$)$_2$ --

Column 8, Line 4, "$Q^0.X_y$" should be -- $Q^0$•$X_y$ --

Column 8, Line 18, "$D^0.X_y$" should be -- $D^0$•$X_y$ --

Column 8, Line 20, "$E^0.X_y$" should be -- $E^0$•$X_y$ --

Column 8, Line 22, "$M^0.X_y$" should be -- $M^0$•$X_y$ --

Column 9, Line 61, "$Q^0.X_y$" should be -- $Q^0$•$X_y$ --

Column 10, Line 4, "$Q^0.X_y$" should be -- $Q^0$•$X_y$ --

Column 10, Line 25, "$Q^0.X_y$" should be -- $Q^0$•$X_y$ --

Column 10, Line 61, "$Q^0.X_y$" should be -- $Q^0$•$X_y$ --